United States Patent
Teixeira

(10) Patent No.: US 11,716,222 B2
(45) Date of Patent: Aug. 1, 2023

(54) COMMUNICATIONS BRIDGE

(71) Applicant: CAPZUL LTD, London (GB)

(72) Inventor: Marcio Coelho Teixeira, Belo Horizonte (BR)

(73) Assignee: CAPZUL LTD, London (GB)

( * ) Notice: Subject to any disclaimer, the term of this patent is extended or adjusted under 35 U.S.C. 154(b) by 0 days.

(21) Appl. No.: 17/256,227

(22) PCT Filed: Jun. 28, 2019

(86) PCT No.: PCT/IB2019/055513
§ 371 (c)(1),
(2) Date: Dec. 27, 2020

(87) PCT Pub. No.: WO2020/003238
PCT Pub. Date: Jan. 2, 2020

(65) Prior Publication Data
US 2021/0226815 A1 Jul. 22, 2021

Related U.S. Application Data

(60) Provisional application No. 62/692,312, filed on Jun. 29, 2018.

(51) Int. Cl.
*H04L 12/46* (2006.01)
*H04L 45/02* (2022.01)
*H04L 45/12* (2022.01)
*H04L 9/40* (2022.01)
*H04L 45/121* (2022.01)

(52) U.S. Cl.
CPC ...... *H04L 12/4625* (2013.01); *H04L 63/0471* (2013.01); *H04L 45/026* (2013.01); *H04L 45/121* (2013.01)

(58) Field of Classification Search
None
See application file for complete search history.

(56) References Cited

U.S. PATENT DOCUMENTS 6,003,084 A 12/1999 Green et al.
7,136,359 B1 11/2006 Coile et al.
(Continued)

OTHER PUBLICATIONS

ISA/CA, International Search Report and Written Opinion, dated Nov. 13, 2019, re PCT International patent application No. PCT/IB2019/055513.

*Primary Examiner* — Peter Chen
*Assistant Examiner* — Jeff Banthrongsack
(74) *Attorney, Agent, or Firm* — Perry + Currier Inc.

(57) ABSTRACT

A system includes a plurality of computer devices connected to a network. The computer devices are operable by a plurality of users. The system further includes a server connected to the network. The server is to communicate data with the plurality of computer devices. The system further includes a bridge device connected to the network. The bridge device is to receive connection requests from the plurality of computer devices via the network. The bridge device is further to receive connection requests from the server via the network. The bridge device is further to mediate data communications between the plurality of computer devices and the server by communicating data through open connections made based on connection requests received from the plurality of computer devices and the server.

13 Claims, 6 Drawing Sheets

(56) References Cited

U.S. PATENT DOCUMENTS

| | | |
|---|---|---|
| 9,756,135 B2 | 9/2017 | Sama et al. |
| 10,038,696 B1 | 7/2018 | Marcovecchio et al. |
| 2006/0168239 A1* | 7/2006 | Gauthier ............. H04L 63/0209 709/227 |
| 2008/0155067 A1 | 6/2008 | Rivera |
| 2010/0268832 A1 | 10/2010 | Lucas et al. |
| 2013/0179593 A1 | 7/2013 | Dunlap et al. |
| 2014/0310512 A1 | 10/2014 | Sau et al. |
| 2017/0063798 A1 | 3/2017 | Lapidous |
| 2018/0159902 A1* | 6/2018 | Murphy .............. H04L 67/2823 |

* cited by examiner

COMMUNICATIONS BRIDGE

FIELD

The present disclosure relates to computer networking and data communications architecture.

BACKGROUND

Security of data communications is a primary concern to users of the internet and other computer networks. Bad actors are known to infiltrate computer systems to steal data, harm systems, or modify functionality. Current computer systems, particularly highly active servers, are open to such attacks.

SUMMARY

According to an aspect of the present invention, a system includes a plurality of computer devices connected to a network. The computer devices are operable by a plurality of users. The system further includes a server connected to the network. The server is to communicate data with the plurality of computer devices. The system further includes a bridge device connected to the network. The bridge device is to receive connection requests from the plurality of computer devices via the network. The bridge device is further to receive connection requests from the server via the network. The bridge device is further to mediate data communications between the plurality of computer devices and the server by communicating data through open connections made based on connection requests received from the plurality of computer devices and the server.

All inbound ports to the server may be closed.

The system may further include a router, switch, or firewall that connects the server to the network. The router, switch, or firewall may have all inbound ports closed.

The bridge device may provide encrypted data communications between each of the plurality of computer devices and the server.

According to another aspect of the present invention, a bridge device includes a communications interface to connect to a network, memory, and a processor connected to the memory and the communications interface. The processor is to receive connection requests from a plurality of computer devices via the network. The processor is further to receive connection requests from a server via the network. The processor is further to provide data communications between the plurality of computer devices and the server through open connections made based on the connection requests received from the plurality of computer devices and the server.

The processor may not transmit connection requests to the server.

The processor may provide encrypted data communications between each of the plurality of computer devices and the server.

The memory may store public encryption keys for the plurality of computer devices and the server.

The bridge device may further include an index of servers to bridge devices. The processor may use the index to identify another bridge device to provide data communications between a particular computer device and the server.

The bridge device may further include a correlation table to correlate connections with the plurality of computer devices to connections with the server.

According to another aspect of the present invention, a server includes a communications interface to connect to a network, memory, and a processor connected to the memory and the communications interface. The processor executes an application. The server further includes a connection agent to make connection requests to a bridge device. The connection agent is further to communicate data between the application and the bridge device over an open connection.

All inbound ports to the server may be closed.

The connection agent may initiate a new connection request to the bridge device when all existing connections are in use.

The connection agent may close an inactive connection with the bridge device.

DETAILED DESCRIPTION

The present invention aims to reduce or eliminate the ability to infiltrate a computer server or other endpoint. A bridge device manages communications between endpoints, such as user computers and a server. The bridge device responds to requests from endpoints. The bridge device does not issue requests to a server that is expected to experience infiltration. Rather, the bridge device responds to requests from the server. Accordingly, all inbound ports of the server or its supporting network infrastructure (router, switch, firewall, etc.) may be closed to new connections. As such, the server or its supporting network infrastructure initiates new connections with the bridge device. The bridge device, or any other device for that matter, cannot initiate a new connection to the server, as all inbound ports of the server or its supporting network infrastructure are closed. An attacker targeting the server will find all inbound ports closed and will be unable to make new connections to the server. Hence, the server will be less likely to be infiltrated.

Figure 1:
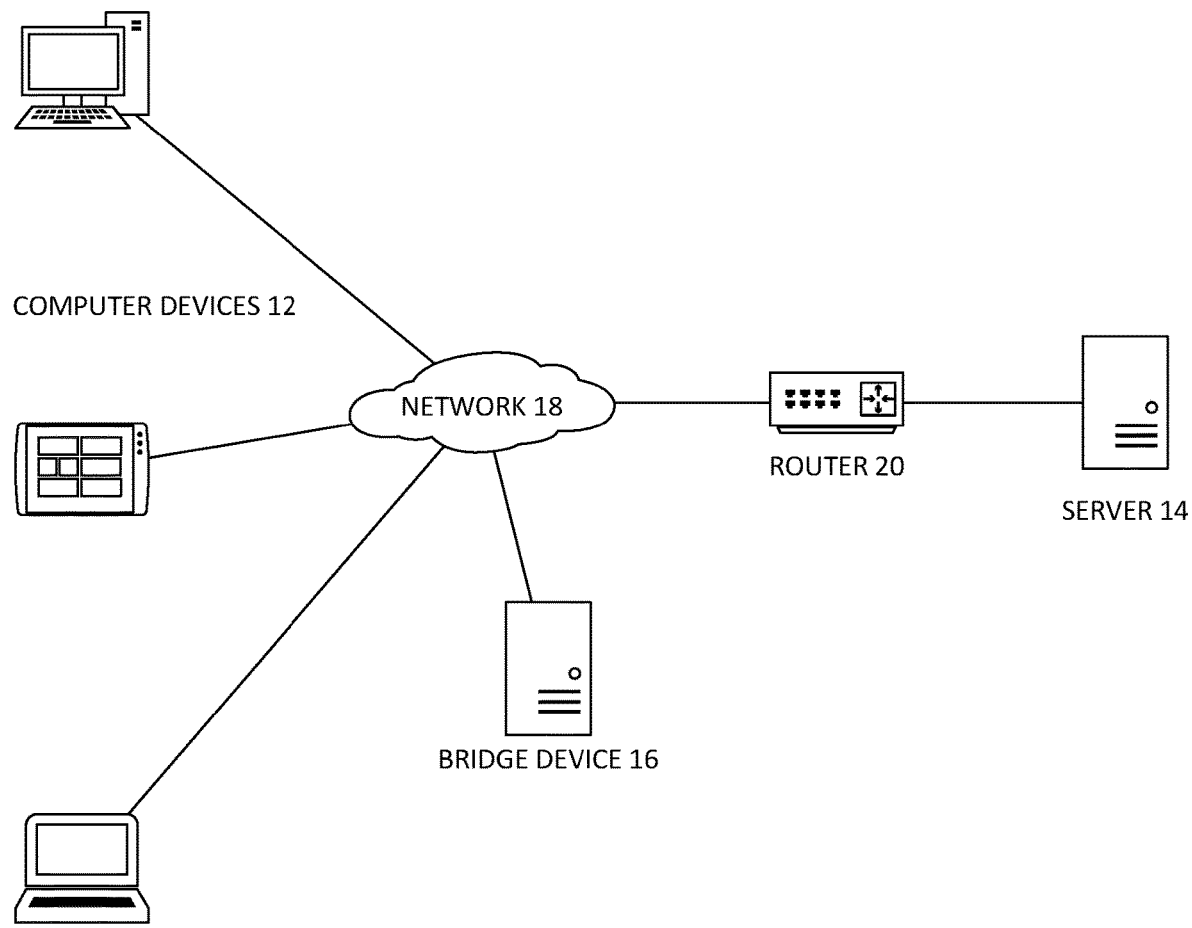
FIG. 1 is a block diagram of an example computer network that includes a bridge device.

FIG. 1 shows an example system 10. The system 10 includes a plurality of computer devices 12, a server 14, and a bridge device 16. All components may be interconnectable via a network 18, such as the internet. The computer devices 12 and server 14 are examples of endpoints and other examples are contemplated.

The computer devices 12 are operable by a plurality of users. The computer devices 12 may include notebook computers, smartphones, desktop computers, servers, or any other computer device operable by a user.

The server 14 is to communicate data with the computer devices 12. Examples of servers include web servers, database servers, image hosting servers, email servers, messaging servers, file storage servers, social network servers, enterprise servers, and the like. Any number of cooperating servers 14 may be provided.

The bridge device 16 is to receive requests from the computer devices 12 via the network 18. The bridge device 16 may have one or more inbound ports open to accept such requests. The bridge device 16 is also to receive requests from the server 14 via the network 18. Such requests may be configured to initiate new connections with the bridge device 16. Connection requests may accord to any suitable protocol, such as HTTP, HTTPS, and the like. Connections may accord to any suitable protocol, such as TCP/IP.

The bridge device 16 responds to requests by, if appropriate, accepting a new connection request and opening a connection with the requesting endpoint, such as a computer device 12 or server 14. Once a connection is established with an endpoint, bidirectional communication of data between the bridge device 16 and that endpoint may occur. As such, bidirectional communication of data between two endpoints, such as a computer device 12 and a server 14 may be mediated by the bridge device 16 through two separate connections at the bridge device 16.

Establishing a new connection is at the request of the endpoint, such as a computer device 12 or server 14. The bridge device 16 may respond with an acceptance of a new connection. Hence, new connection requests are unidirectional and inbound to the bridge device 16. An established connection, of course, allows for bidirectional data communications between the bridge device 16 and the respective endpoint 12, 14.

Any endpoint may have all inbound ports closed. Specifically, the server 14 or its supporting network infrastructure (router, switch, firewall, etc.) 20 may have all inbound ports closed. As such, the server 14 or its supporting network infrastructure 20 refuses all new connection requests. Any connection-related functionality attributed herein to a server 20 may be instead carried out by the server's supporting network infrastructure 20.

The computer devices 12 and the server 14 may be provided with the network address of the bridge device 16, so as to facilitate new connection requests outbound from the computer devices 12 and the server 14. Such a network address may be an IP address.

In various scenarios, user-controlled endpoints, such as the computers 12, may initiate connections to an endpoint, such as a server 14. As such, connection requests from the computer device 12 may be user-initiated. For example, a user may direct a web browser or other user agent to connect to a web server or other type of server. The computer device 12 may then connect to the bridge device 16. On the other hand, endpoints that are not directly controlled by users, such as the server 14, may periodically issue new connection requests to the bridge device 16. The bridge device 16 may maintain an open connection with a server 14 and may assign the open connection to a new connection accepted from a computer device 12 that may a request to connect to that server 14. The server 14 may monitor its own connections to the bridge device 16 and may issue a new connection request to the bridge device 16 if all established connections are in use. The bridge device 16 may accept new connections from endpoints and may keep alive such connections, while matching established connections to endpoints attempting to communicate with each other.

A bridge device 16 may provide encrypted data communications between each of the computer devices 12 and the server 14. To facilitate this, the bridge device 16 may store public encryption keys of the computer devices 12 and the server 14. The bridge device 16, computer devices 12, and the server 14 may each store their respective private keys that are not shared with other entities. Thus, information communicated by the server 14 may be encrypted by the server 14 using the server's private key. The bridge device 16 may then decrypt such information using the server's public key and then encrypt such information using the computer device's public key. The bridge may then transmit the information to the computer device 12, which may then decrypt the information using its private key. In some examples, the information encrypted in this manner is routing information or metadata about a request or response. In such examples, point-to-point encryption between the server 12 and computer device 12 may be used to prevent data from being visible to the bridge device 16. That is, a data payload may be encrypted according to a scheme/key agreed by a computer device 12 and server 14. Then, routing information and/or metadata about the payload may be combined with the encrypted payload. The combined packet may then be encrypted according to a scheme/key known to the bridge device 16. As such, the bridge device 16 may access the routing information and/or metadata but not the payload, which remains private to the computer device 12 and server 14.

Figure 2:
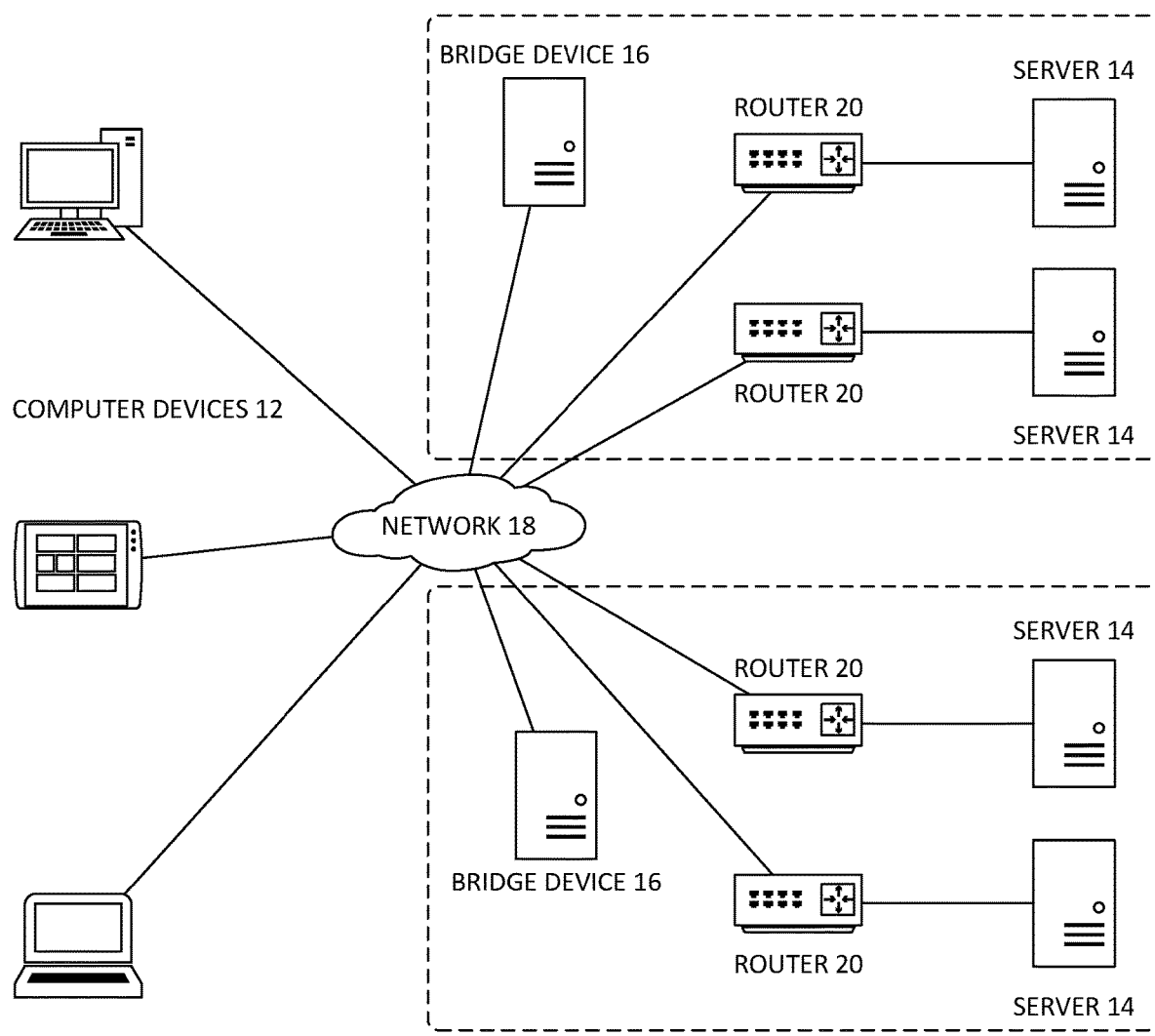
FIG. 2 is a block diagram of an example computer network that includes several bridge devices.

As shown in FIG. 2, a plurality of bridge devices 16 may support a plurality of servers 14. A given bridge device 16 may support a subset of all servers 14. Accordingly, a bridge device 16 may maintain a list of servers supported by other bridge devices 14. A bridge device 16 may be responsive to request to connect to unsupported servers 14 by redirecting such request to an appropriate bridge device 16.

Figure 3:
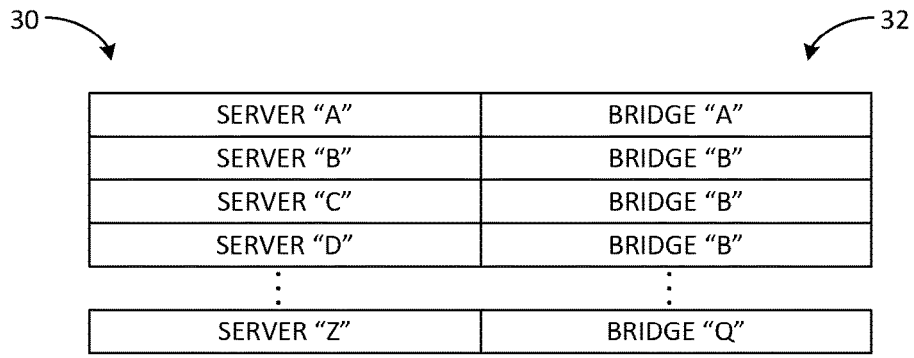
FIG. 3 is a schematic diagram of an example index of servers and bridge devices.

FIG. 3 shows an example list or index of supported servers 14 that may be stored by a bridge device 16 to assist in routing new connection requests to appropriate bridge devices 14. Each bridge device 16 may store such an index.

The index may associate server identifiers 30 with identifiers 32 of bridge devices 16 that are known to receive and maintain connections with various servers 14. A server identifier 30 may include a network address, such as an IP address, a URL, domain name, or the like. A server identifier 30 may be provided in a request made by a computer device 12. The bridge device 16 that receives the request from the computer device 12 may then refer to the index to look up a bridge device 16 that may be used to communicate with the server 14 identified in the request. The bridge device 16 that receives the request may itself maintain a connection with the requested server 14 and this may also be reflected in the index. A bridge identifier 32 may include a unique name/ID for each bridge device 16, such as "demo1.test1.vpz" and may additionally or alternatively include a network address for the bridge device 16, such as an IP address, a URL, domain name, or the like and/or routing information to communicate with the bridge device 16.

Indexes at different bridge devices 16 may be different. The bridge devices 16 may share their indexes regularly, periodically, or according to another methodology. A bridge device 16 may update its index according to an index received from another bridge device 16. In other examples, a master index is stored at a server and all bridge devices 16 obtain a copy of the master index or a portion thereof.

Figure 4:
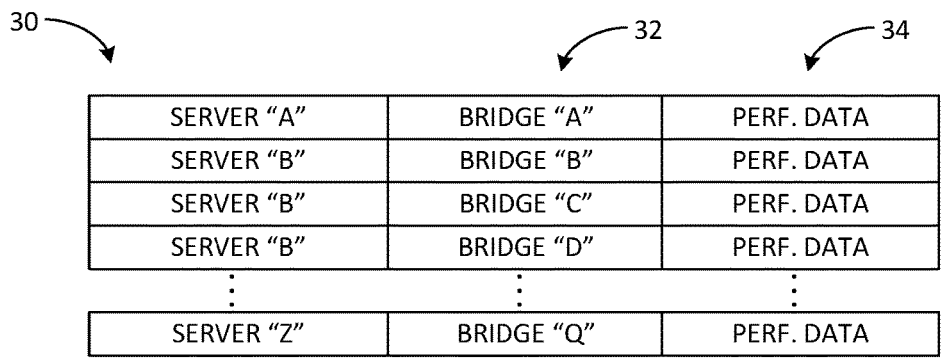
FIG. 4 is a schematic diagram of an example index of servers and bridge devices with performance data.

Routing of data through bridge devices 16 may be optimized to reduce latency and/or error rate. As shown in FIG. 4, performance data 34 may be stored in an index of server identifiers 30 and bridge identifiers 32. A bridge device 16 may monitor latency, error rate, or other performance information of data communicated overs its connections. When the same server 14 is accessible via multiple other bridge devices 16, the bridge device 16 receiving the request may then communicate the request to a better performing bridge device 16. The bridge device 16 may additionally or alternatively communicate to the requesting computer device 12 the identifier of the better performing bridge device 16, so that the computer device 12 may make the next request for the same server directly to the better performing bridge device 16.

Figure 5:
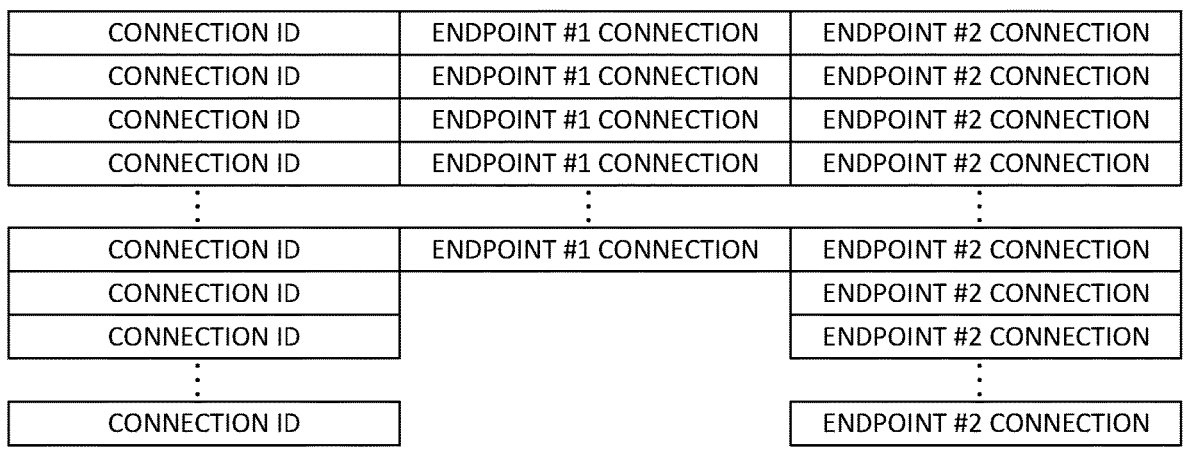
FIG. 5 is a schematic diagram of a table of bridge connections.

As shown in FIG. 5, a bridge device 16 may maintain a correlation table of its connections. A connection with a particular computer device 12 may be correlated to a connection with a particular server 14. The bridge device 16 may therefore route data communications appropriately according to the correlation table. In the example depicted, the bridge device 16 may assign a connection identifier to two connections to two endpoints (e.g., #1 and #2) that are in communication. Endpoint connections may be tracked by network address, hostname, IP address, port number, socket, and/or similar information. Further, the bridge device 16 may also track open but unused connections that may be opened in response to requests received from servers 14. Such connections (e.g., shown as endpoint #2 connections not mapped to endpoint #1 connections) may be kept alive without actual data transfer until such time that a computer device 12 requests information from such a server 14.

The bridge device 16 may format an outbound communication with an endpoint 12, 14 to appear as if the outbound communication originated from the respective endpoint 12, 14. That is, bridge device 16 may appear as the server 14 to the computer device 12, and may appear as the computer device 12 to the server 14. Such formatting may include modifying packet headers, address information, hostnames, domain names, or the like. Alternatively, such formatting may be performed by the endpoints 12, 14 themselves.

Figure 6:
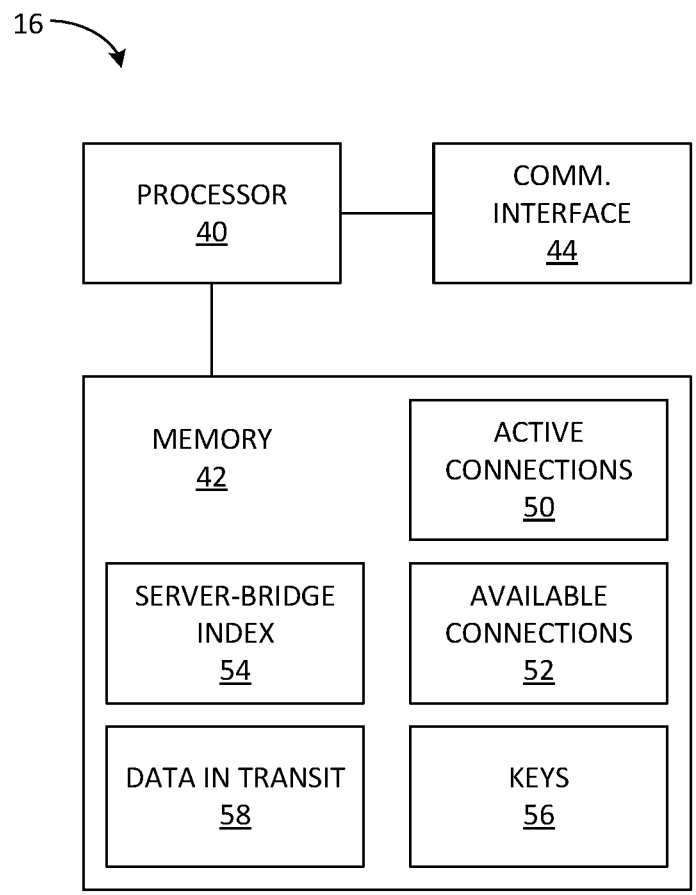
FIG. 6 is a block diagram of an example bridge device.

As shown in FIG. 6, a bridge device 16 may include a processor 40, memory 42, and communications interface 44 to connect to a network. The processor 40 may be connected to the communications interface 44 and the memory 42. The processor 40 may execute instructions, which may be stored in the memory 42, to implement the functionality described herein.

The processor 40 may include a central processing unit (CPU), a microcontroller, a microprocessor, a processing core, a field-programmable gate array (FPGA), and/or similar device capable of executing instructions. The processor 40 may cooperate with the memory 42, which may include a non-transitory machine-readable medium that may be an electronic, magnetic, optical, and/or other physical storage device that encodes executable instructions. The machine-readable medium may include, for example, random access memory (RAM), read-only memory (ROM), electrically-erasable programmable read-only memory (EEPROM), flash memory, a storage drive, an optical disc, and/or similar.

The bridge device 16 may include a list of active connections 50, a list of available connections 52, an index 54 of servers 14 correlated to bridge devices 16, encryption keys 56, and data 58 in transit between connected servers 14 and computer devices 12. This information may be stored in the memory 42.

The list of active connections 52 correlates open connections with computer devices 12 to open connections to servers 14, such as shown in the top half of FIG. 5. The list of active connections 52 may be reference to correctly route data between a computer device 12 and a server 14.

The list of available connections 54 tracks connections established in response to requests from servers 14, such as shown in the bottom half of FIG. 5. This list may be referenced by the bridge device 16 when receiving a new request from a computer device. If a connection to the requested server 14 is available, the bridge device 16 may assign it to the computer device 12. When an available connection is assigned to a computer device, the available connection is removed from the list of available connections 54 and added to the list of active connections 52. Conversely, when a computer device 12 stops using an active connection, then the active connection is removed from the list of active connections 52 and added to the list of available connections 54. Alternatively, a connection that goes inactive may be closed with both the client device 12 and the server 16. A new available connection may then be opened in response to a later request from the server 16. The bridge device 16 may monitor connections for data transfer and determine that a connection is no longer active after a timeout has elapsed.

The list of available connections 54 and the list of active connections 52 may be the same list, such as shown in FIG. 5. A database may be used to store the lists 52, 54.

The index 54 of server-bridge correlations may be used by the bridge device 16 to route a request from a computer device 12 to a bridge device 16 that maintains a connection to the requested server 14. Examples of an index 54 are shown in FIGS. 3 and 4.

The encryption keys 56 may be used by the bridge device 16 to decrypt/encrypt data communicated between connected computer devices 12 and servers 14. As mentioned above, the bridge device 16 may be configured to decrypt routing information or meta data without having access to the main data payload, which may be protected by endpoint encryption between the communicating computer device 12 and server 14.

Figure 7:
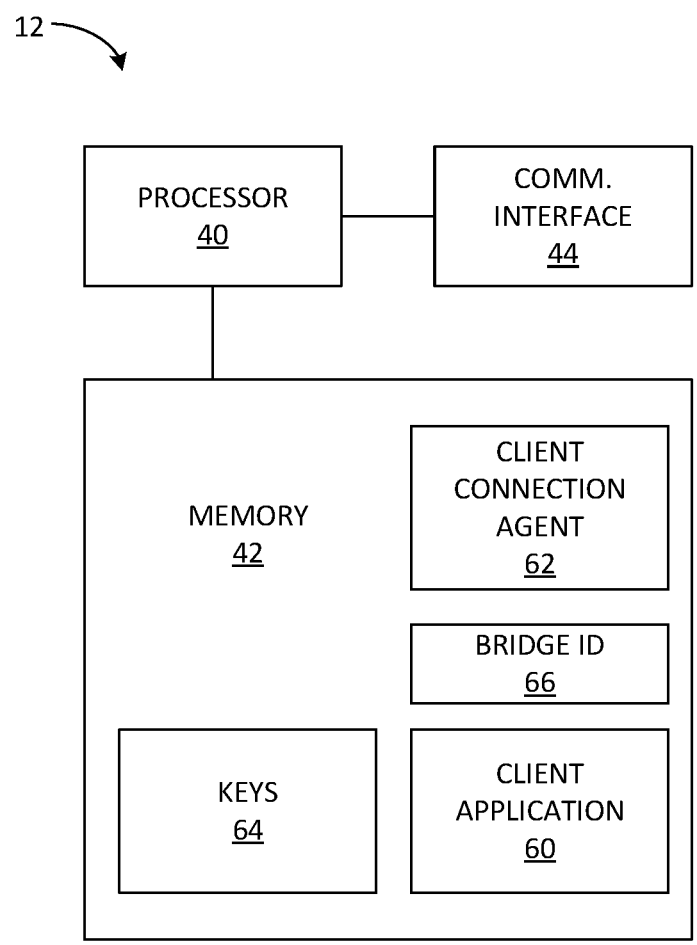
FIG. 7 is a block diagram of an example computer device.

An example computer device 12 is shown in FIG. 7. The computer device 12 may include a processor 40, memory 42, and communications interface 44. The computer device 12 may further include a client application 60, client connection agent 62, and encryption keys 64. Any of this information may be stored in the memory 42.

The client application 60 may be a user application that is to communicate with a server 14. Examples of such applications include web browsers, database interfaces, document storage/processing applications, chat/email/messaging applications, and similar.

The client connection agent 62 connects to a bridge device 16 specified by a bridge identifier 66, which may also be stored in memory 42. Any number of bridge identifiers 66 may be used to specify any number of bridge devices 16. The client connection agent 62 is configured to receive or intercept network requests from the client application 60 and to direct such network requests to a bridge device 16. The client connection agent 62 may also receive responses from the bridge device 16, which acts as an intermediary for the server 14 that was the intended target of the request, and communicate such responses to the client application 60.

The client connection agent 62 may be implemented as an independent program, such as a TCP/IP driver, that serves multiple different client applications 60. Alternatively, the client connection agent 62 may be integrated with a particular client application 60 (e.g., a plugin or complete integration). The client connection agent 62 may include software, hardware, or a combination of such.

The encryption keys 64 may be used by the client connection agent 62 and/or client application 60 to encrypt requests, data, and/or header or routing information.

Figure 8:
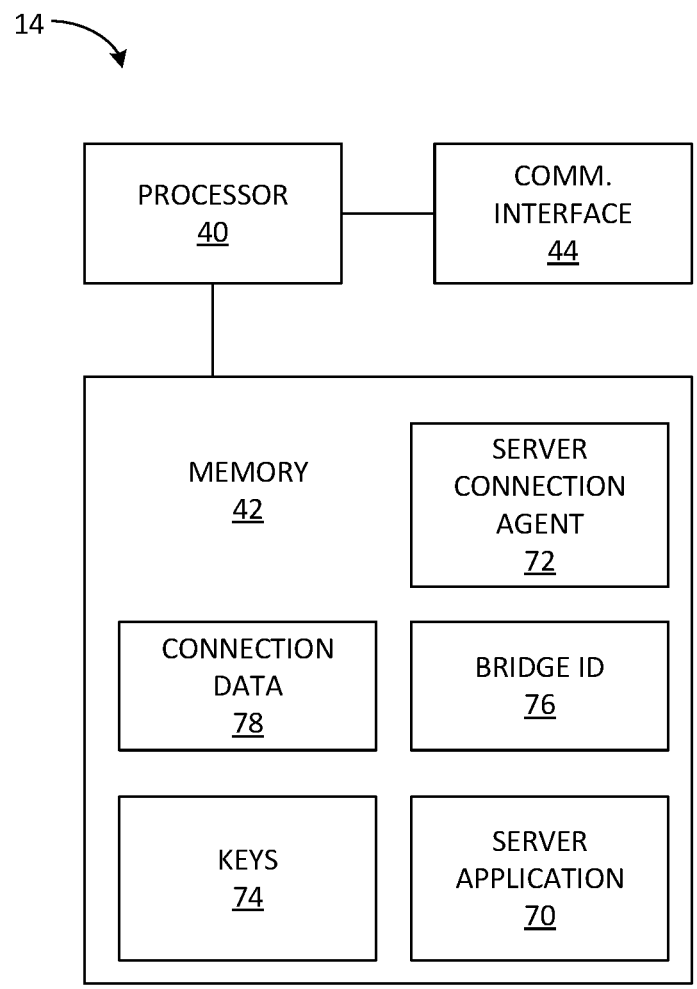
FIG. 8 is a block diagram of an example server.

An example server 14 is shown in FIG. 8. The server 14 may include a processor 40, memory 42, and communications interface 44. The server 14 may further include a server application 70, server connection agent 72, and encryption keys 74. Any of this information may be stored in the memory 42.

The server application 70 may operate to respond to requests originating from a computer device 12 and handled through the bridge device 16. Examples of such applications include web servers, database servers, document storage/processing servers, chat/email/messaging servers, and similar.

The server connection agent 72 connects to a bridge device 16 specified by a bridge identifier 76, which may also be stored in memory 42. Any number of bridge identifiers 76 may be used to specify any number of bridge devices 16. The server connection agent 72 is configured to provide requests and/or data received from the bridge device 16 to the server application 70. The server connection agent 72 may also receive responses from the server application 70 and communicate such responses to the bridge device 16. The server connection agent 72 initiates and manages outgoing connections from the server 14 to the bridge device 16 and communicates traffic through such connections.

The server connection agent 72 may store and manipulate connection data 78 to monitor active connections to the bridge device 16. Connection data 78 may include a list of connections with indications of recent activity. Connection data 78 may map a connection with the bridge device 16 to a server application 70 or session. Connection data 78 may store an identity or properties of a computer device 12 originating a request. The server connection agent 72 may initiate a new connection to a bridge device 16 when connection data 78 indicates that all existing connections are in use.

The server connection agent 72 may communicate keep-alive signals to the bridge device 16 to keep a connection active if, for example, further use of the connection is expected. The server connection agent 72 may initiate the closing of a connection if, for example, further use of the connection is not expected. The server connection agent 72 is different from the client connection agent 62 in the sense that that the client connection agent 62 makes requests based on user driven-events, whereas the server connection agent 72 monitors connection activity usage and (1) closes connections when unneeded/unused, (2) sends keep-alive signals to keep useful connections open, and/or (3) initiates new connections when all existing connections are in use. The server connection agent 72 is configured in this way because, in contrast to conventional servers that respond to incoming connection requests, the server 14 can only make outgoing connection requests.

The server connection agent 72 may be implemented as an independent program, such as a TCP/IP driver, that serves multiple different server applications 70. Alternatively, the server connection agent 72 may be integrated with a particular server application 70 (e.g., a plugin or complete integration). The server connection agent 72 may include software, hardware, or a combination of such.

The encryption keys 74 may be used by the server connection agent 72 and/or server application 70 to encrypt data and/or header or routing information.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A system comprising:
a plurality of computer devices connected to a network, the plurality of computer devices operable by a plurality of users;
a server connected to the network, the server to communicate data with the plurality of computer devices; and
a bridge device connected to the network, the bridge device to receive connection requests from the plurality of computer devices via the network, the bridge device further to receive connection requests from the server via the network, the bridge device further to mediate data communications between the plurality of computer devices and the server by communicating data through open connections made based on connection requests received from the plurality of computer devices and the server, wherein an open connection from the server that is not assigned to any of the plurality of computer devices is an available connection;
wherein the bridge device includes an index of servers to bridge devices, wherein the bridge device is to use the index to determine an identifier of another bridge device to provide data communications between a particular computer device of the plurality of computer devices and the server, and wherein the bridge device is to communicate the identifier of the other bridge device to the particular computing device when the bridge device lacks the available connection to the server.

2. The system of claim 1, wherein all inbound ports to the server are closed.

3. The system of claim 1, further comprising a router, switch, or firewall that connects the server to the network, the router, switch, or firewall having all inbound ports closed.

4. The system of claim 1, wherein the bridge device provides encrypted data communications between each of the plurality of computer devices and the server.

5. A bridge device comprising:
a communications interface to connect to a network;
memory;
a processor connected to the memory and the communications interface, the processor to receive connection requests from a plurality of computer devices via the network, to receive connection requests from a server via the network, and to provide data communications between the plurality of computer devices and the server through open connections made based on the connection requests received from the plurality of computer devices and the server, wherein an open connection from the server that is not assigned to any of the plurality of computer devices is an available connection; and
an index of servers to bridge devices, wherein the processor is to use the index to determine an identifier of another bridge device to provide data communications between a particular computer device and the server, and wherein the processor is to communicate the identifier of the other bridge device to the particular computing device when the bridge device lacks the available connection to the server.

6. The bridge device of claim 5, wherein the processor does not transmit connection requests to the server.

7. The bridge device of claim 5, wherein the processor provides encrypted data communications between each of the plurality of computer devices and the server.

8. The bridge device of claim 5, wherein the memory stores public encryption keys for the plurality of computer devices and the server.

9. The bridge device of claim 5, further comprising correlation table to correlate connections with the plurality of computer devices to connections with the server.

10. A server comprising:
a communications interface to connect to a network;
memory; and
a processor connected to the memory and the communications interface, the processor to execute an application; and
a connection agent to make connection requests to a bridge device, the connection agent further to communicate data between the application and the bridge device over an open connection, wherein if the open connection is not assigned by the bridge device to a computer device, the open connection is an available connection;
wherein the bridge device to which the connection agent makes the connection is identified at an index of servers to bridge devices, wherein the index correlates the server to the bridge device, and wherein an identifier of the bridge device is shared with computer devices intending to access the application when the available connection exists.

11. The server of claim 10, wherein all inbound ports to the server are closed.

12. The server of claim 10, wherein the connection agent is to initiate a new connection request to the bridge device when all existing connections are in use.

13. The server of claim 10, wherein the connection agent is to close an inactive connection with the bridge device.

* * * * *